United States Patent
Yamada et al.

(10) Patent No.: US 7,257,352 B2
(45) Date of Patent: Aug. 14, 2007

(54) IMAGE FORMING DEVICE AND IMAGE FORMING METHOD

(75) Inventors: Kunio Yamada, Kanagawa (JP);
Makoto Hirota, Kanagawa (JP);
Junichi Maekawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 266 days.

(21) Appl. No.: 10/524,022

(22) PCT Filed: Mar. 17, 2003

(86) PCT No.: PCT/JP03/03130

§ 371 (c)(1),
(2), (4) Date: Feb. 17, 2005

(87) PCT Pub. No.: WO2004/019274

PCT Pub. Date: Mar. 4, 2004

(65) Prior Publication Data
US 2006/0024089 A1 Feb. 2, 2006

(30) Foreign Application Priority Data
Aug. 20, 2002 (JP) ............................. 2002-239833

(51) Int. Cl.
*G03G 15/36* (2006.01)
*H04N 1/21* (2006.01)

(52) U.S. Cl. ...................... 399/194; 358/444

(58) Field of Classification Search ................. 399/182, 399/183, 184, 194; 358/404, 444, 450, 494; 382/284, 294, 305
See application file for complete search history.

(56) References Cited

U.S. PATENT DOCUMENTS

| 5,083,162 A | 1/1992 | Hanamoto et al. |
| 5,337,406 A * | 8/1994 | Takakura et al. ........... 715/520 |
| 5,592,304 A * | 1/1997 | Udagawa et al. .......... 358/444 |

FOREIGN PATENT DOCUMENTS

| JP | A 55-159976 | 12/1980 |
| JP | A 63-306470 | 12/1988 |
| JP | A 01-115634 | 5/1989 |
| JP | A 02-169784 | 6/1990 |
| JP | A 09-104987 | 4/1997 |

* cited by examiner

*Primary Examiner*—Hoan Tran
(74) *Attorney, Agent, or Firm*—Oliff & Berridge, PLC (57) ABSTRACT

An image forming device for adequately forming an image in which images overlap one another. The priority order (display order) of the images overlapping with one another is judged for the area where images of different attributes overlap with one another. When the priority rank of a three-dimensional image is high, a planar image in the overlapping area is deleted, or a three-dimensional image is formed on a planar image. When the rank of a planar image is high, only the color image of a three-dimensional image in the overlapping area is deleted, and a planar image is formed using foaming toner.

14 Claims, 12 Drawing Sheets

IMAGE FORMING DEVICE AND IMAGE FORMING METHOD

TECHNOLOGICAL FIELD

The present invention relates to an image forming device and an image forming method, and more particularly, to an image forming device for printing a composite image with which a plurality of images are overlapped one over another and an image forming method for the same.

BACKGROUND TECHNOLOGY

With the advance of the application software for image drawing, images having a variety of colors and patterns are processed and edited on personal computers (PC) and work stations (WS).

Further, with the advance of the image forming devices using the electrophotography method, the ink jet method, and the like, it has been made possible to print the images created by such application software on paper or the like with high precision.

Conventionally, when a composite image having an overlapping area where parts of different images (figures), characters, and the like are overlapped one over another is to be represented by using application software, an image having a higher priority rank has been preferentially represented on the basis of priority ranks (display order) which are normally established for the images.

On the application software, such a composite image is handled as if, in the overlapping area, both images were given. Conventionally, when an image is to be formed with an image forming device, only the image which priority rank is higher has been formed into an image if it is opaque. On the other hand, if the image having a higher priority rank is transparent, the image processing has been separately applied to the overlapping area so as to form an image in which both the images are blended into one.

This is because, for example, when the image which priority rank is higher is opaque, the image which priority rank is lower will not show up to the surface, thus there is no need for forming the image having a lower priority rank into an image. If the image which priority rank is higher is formed into an image on the image formed from the image having a lower priority rank, the geometry and color of the image with a lower priority rank can have an influence on the image having a higher priority rank.

As an example of such a technology, JP H09-104987 A discloses the technology which, by writing a divided job sequence into a map memory, and developing the pixel information in accordance with the result of the overlapping judgment, efficiently carries out detection of the drawing elements which are overlapped one over another, thus preventing the effect of the parallel processing of drawn images from being cancelled.

In recent years, with the advance of the image processing apparatus, there have arisen various demands for the processing up to the stage of image formation.

For example, in order to introduce the electrophotography type image forming device, which eliminates the need for photochemical process, into the light printing market, an electrophotography type image forming device which can provide a still higher quality of image has been required.

In some applications of the electrophotography, there arises a case in which images are formed having a different attribute, such as an embossed image, which has an attribute of height in addition to that of planarity using only color toners, such as embossed printing with which an embossed image is formed by using foaming toners in addition to the conventional color toners.

With these technologies, how the image formation is carried out in the area where the toners are overlaid one over another (in the overlapping area where images are overlapped one over another) is an extremely important problem.

With conventional image forming devices, however, an area where images are overlapped one over another, and an area where images are not overlapped have been differently processed for image formation. Thus, such a problem arose that an error is caused between the respective areas, resulting in a gap being produced at the boundary between the images formed. Also, when the image having a higher priority rank is to be overlapped on the image with a lower one so as to generate a delicate expression for the image formed, it was very difficult to cope with the situation.

In addition, in such a case as that when images having different attributes, i.e., a planar image, which is represented on a planar surface only with color toners, and an embossed image, which represents a height by using foaming toners, are to be represented, it is desirable to carry out image formation also for the image with a lower priority rank.

In view of the above problems, the purpose of the present invention is to provide an image forming device which is capable of adequately forming an image for the areas where images are overlapped one over another.

DISCLOSURE OF THE INVENTION

According to an image forming device of the present invention, the image forming device which forms an image into an image on a recording paper, comprises means for determining that there is an area where two images are overlapped one over another at least partially; and means for determining attributes of these two images, wherein for an image having a specific attribute of these two images, no image is deleted even in the overlapping area.

Also, an image forming device which forms an image into an image on a recording paper, comprises means for determining that there is an area where two images are overlapped one over another at least partially; means for determining priority ranks which represent a top or bottom in overlapped status of these two images in the overlapping area; and means for forming an image which priority rank is lower, and thereupon, forming an image which priority rank is higher, in the overlapping area.

Also, there is further provided means for determining attributes of these two images in the overlapping area, wherein these two images are an image having a specific attribute, and an image having another attribute, when the image having the specific attribute has a priority rank lower than that for the image having the another attribute, the image having the specific attribute is formed into an image, and thereupon, the image having the another attribute is formed into an image in the overlapping area, and when the image having the specific attribute has a priority rank higher than that for the image having the another attribute, the image having the specific attribute is formed into an image, and the image having another attribute being not formed into an image in the overlapping area.

Also, there is further provided means for selecting either forming the image having the specific attribute in the overlapping area into an image, and thereupon, forming the image having the another attribute into an image, or forming the image having the specific attribute in the overlapping area into an image, and not forming the image having the another attribute into an image, when the image having the specific attribute has a priority rank lower than that for the image having the another attribute.

Also, when both of these two images are the image having the specific attribute or the image having the another attribute, the image which has a higher priority rank is formed into an image, and the image which has a lower priority rank is not formed into an image in the overlapping area.

Also, an attribute of the image having the specific attribute is an embossed image.

Next, an image forming method according to the present invention, the image forming method for forming an image into an image on a recording paper, comprises the steps of determining an overlapping area where two images are overlapped at least partially, determining priority ranks which represent a top or bottom in an overlapped status of these two images in the overlapping area, and forming an image which has a lower priority rank into an image, and thereupon, forming the image which has a higher priority rank into an image.

Also, there is further provided the step of determining attributes of these two images in the overlapping area, wherein, when it is determined that both of these two images are an image having a specific attribute and an image having another attribute, the image having the specific attribute is formed into an image, and thereupon, the image having the another attribute is formed into an image in the overlapping area when the image having the specific attribute has a priority rank lower than that for the image having the another attribute, and the image having the specific attribute is formed into an image, and the image having the another attribute is not formed into an image in the overlapping area when the image having the specific attribute has a priority rank higher than that for the image having the another attribute.

Also, an attribute of the image having the specific attribute is an embossed image.

Thus, with the present invention, even when a plurality of images are overlapped one upon anther, the respective images can be represented, regardless of whether or not the images have different attributes, one being a planar image and the other being a stereo one.

BEST MODE FOR CARRYING OUT THE INVENTION

Hereinbelow, an embodiment of the image forming device and the image formation method according to the present invention will be described in detail with reference to the accompanying drawings.

Figure 1:
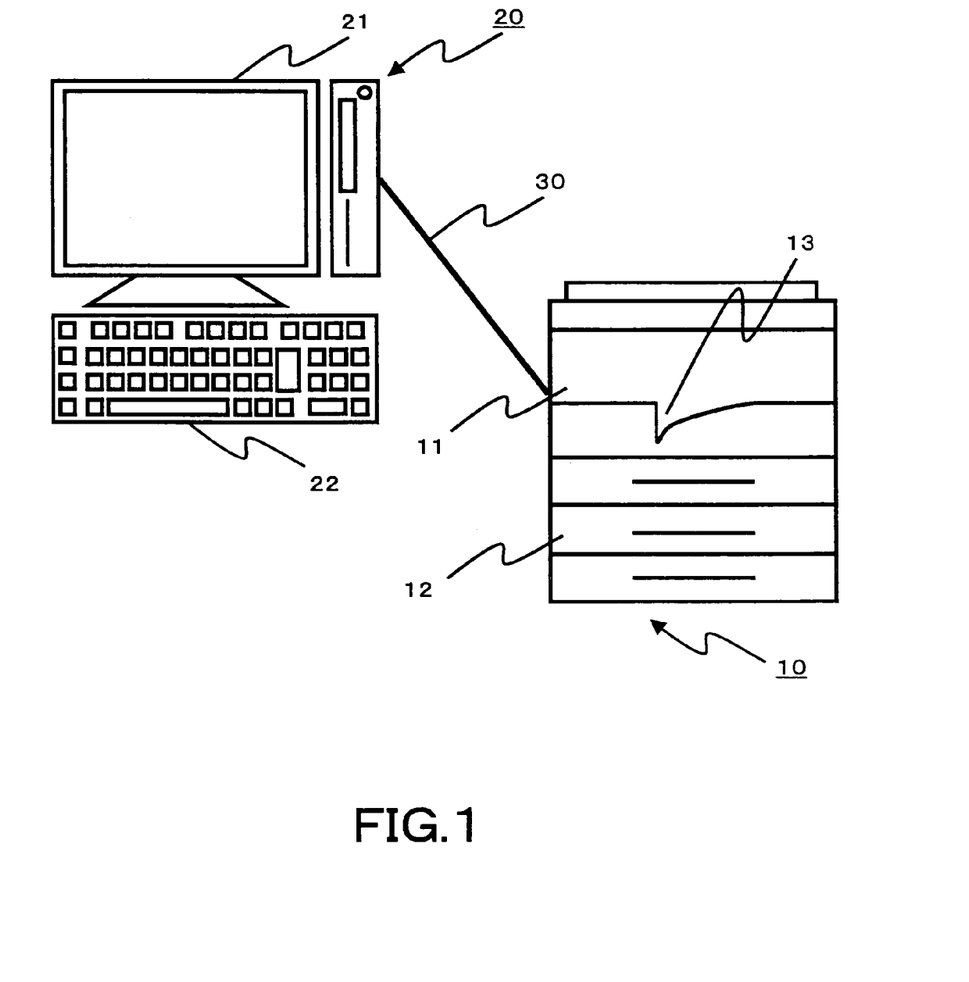
FIG. 1 is a diagrammatic configuration drawing illustrating an example of system comprising an image forming device according to the present invention.

FIG. 1 is a diagrammatic configuration drawing illustrating a system including an image forming device according to the present invention.

This image forming device 10 is configured such that it carries out image formation on the basis of the image data transmitted from an image editing device 20, such as a personal computer (PC) or a work station (WS).

In the image editing device 20, application software for carrying out image edition is installed, which allows editing/processing of an image by operating an operation section 22, such as a keyboard or a mouse, while confirming the image which is displayed on a display 21.

The image forming device 10 comprises an image forming section 11 for carrying out image formation, paper trays 12 for accommodating papers to record images on them, and a recording paper discharge section 13 for discharging a recording paper on which an image is recorded.

The image forming device 10 and the image editing device 20 are connected to each other through a communication cable 30, such as a serial cable or a network cable, or communication means (not shown), such as a radio communication apparatus.

Figure 2:
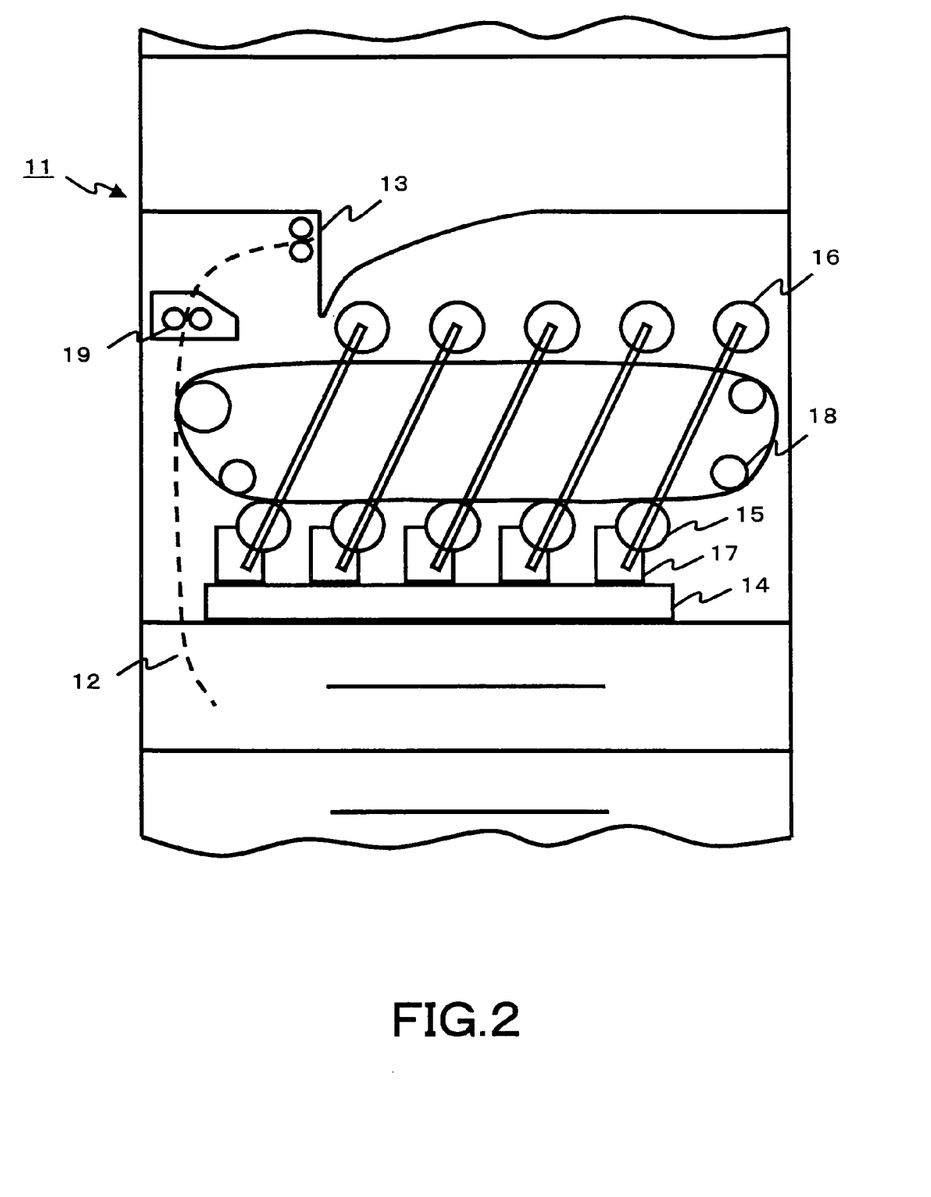
FIG. 2 is a diagrammatic configuration drawing illustrating an example of image forming device according to the present invention.

FIG. 2 is a diagrammatic configuration drawing illustrating an example of image forming device according to the present invention. In the image forming section 11, an image writing device 14, photosensitive media 15, toner bottles 16, developing equipment 17, and an intermediate transfer belt 18 are provided.

Image information transmitted from the image editing device is converted into an image formation data to be transmitted to the image writing device 14, which irradiates laser beam or the like onto the photosensitive medium 15 to create a latent image thereon.

In order to write the image with Y (yellow), M (magenta), C (cyan), K (black) and foaming toners, five toner bottles 16 which respectively contain Y, M, C, K and foaming toners are disposed in the image forming section 11. From the toner bottles 16, the toners are carried to the developing equipment 17, the toners being developed on the photosensitive medium 15 which has been provided with a latent image.

The toner which has been developed on the photosensitive medium 15 is transferred to the intermediate transfer belt 18, and while a recording paper taken out from the paper tray 12 is passed through a secondary transfer section 19, after being passed through the paper transport path (not shown), the image transferred to the intermediate transfer belt 18 is transferred to the recording paper, which, after being heated by the image fixing section (not shown) for fixing the image, is discharged from the recording paper discharge section 13 to the outside of the image forming device 10.

In the present embodiment, in addition to the YMCK, a photosensitive medium is provided to develop the foaming toner in order to form an embossed image together with a color image which is formed by placing color toners on the surface. However, the configuration may be such that an embossed image is formed by replacing any one of the bottles (K toner bottle, for example) with a toner bottle containing the foaming toner or by using some other method.

Figure 3:
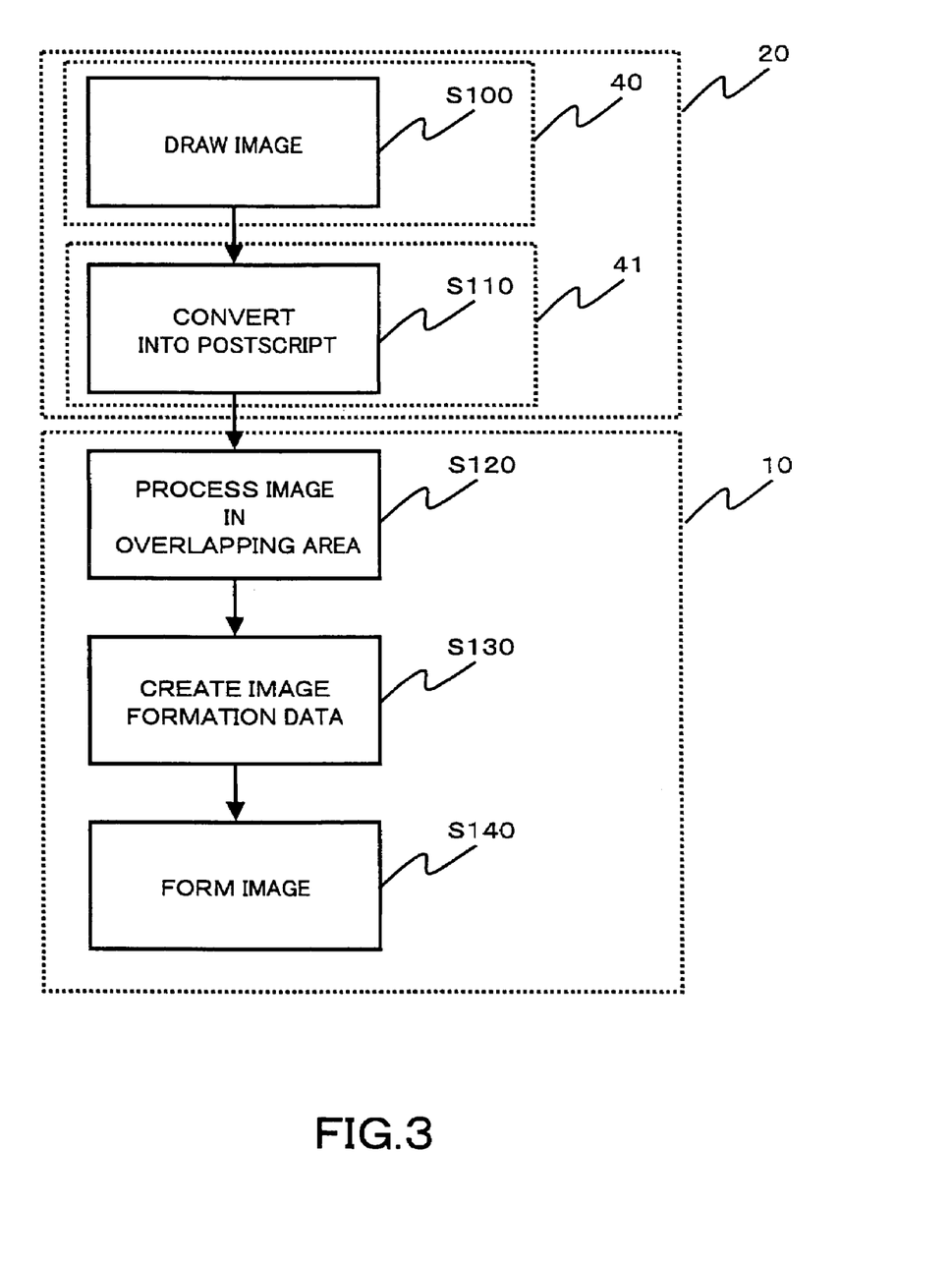
FIG. 3 is a diagrammatic block diagram illustrating a system comprising an image forming device in the present embodiment.

Next, referring to FIG. 3, the flow of processing until the image data is formed into an image will be described.

First, by using application software 40 installed in the image editing device 20, such as a PC or a work station, an image, such as a character or a figure, is processed/edited to carry out the image drawing (at step 100).

Then, by using a printer driver 41 installed in the image editing device 20, the image data for the image which has been drawn is converted into "page description language" with which enlargement, turning, deformation, and the like of the image can be freely performed, such as PostScript (trademark of Adobe Systems, Inc.) (at step 110).

The image data which has been converted into that in the Postscript is transmitted to the controller in the image forming device 10 through the communication cable 30, such as a serial cable or a network cable, which is connected to the image editing device 20. In the controller, the image processing is performed on the area where figures such as circle and square, and image portions such as the text area, are overlapped one over another (at step 120).

Then, on the basis of the image data of the overlapping area on which the image processing has been performed, the image writing device 14 irradiates laser beam or the like onto the photosensitive medium 15 to create image formation data to be used in writing the image (at step 130).

The image formation data thus created is transmitted to the image writing device, and on the basis of this image formation data, laser beam or the like is irradiated onto the photosensitive medium 15. Then, with the image formation process as described with reference to FIG. 2, the image is transferred to the recording paper to form an image thereon (at step 140).

Figure 4:
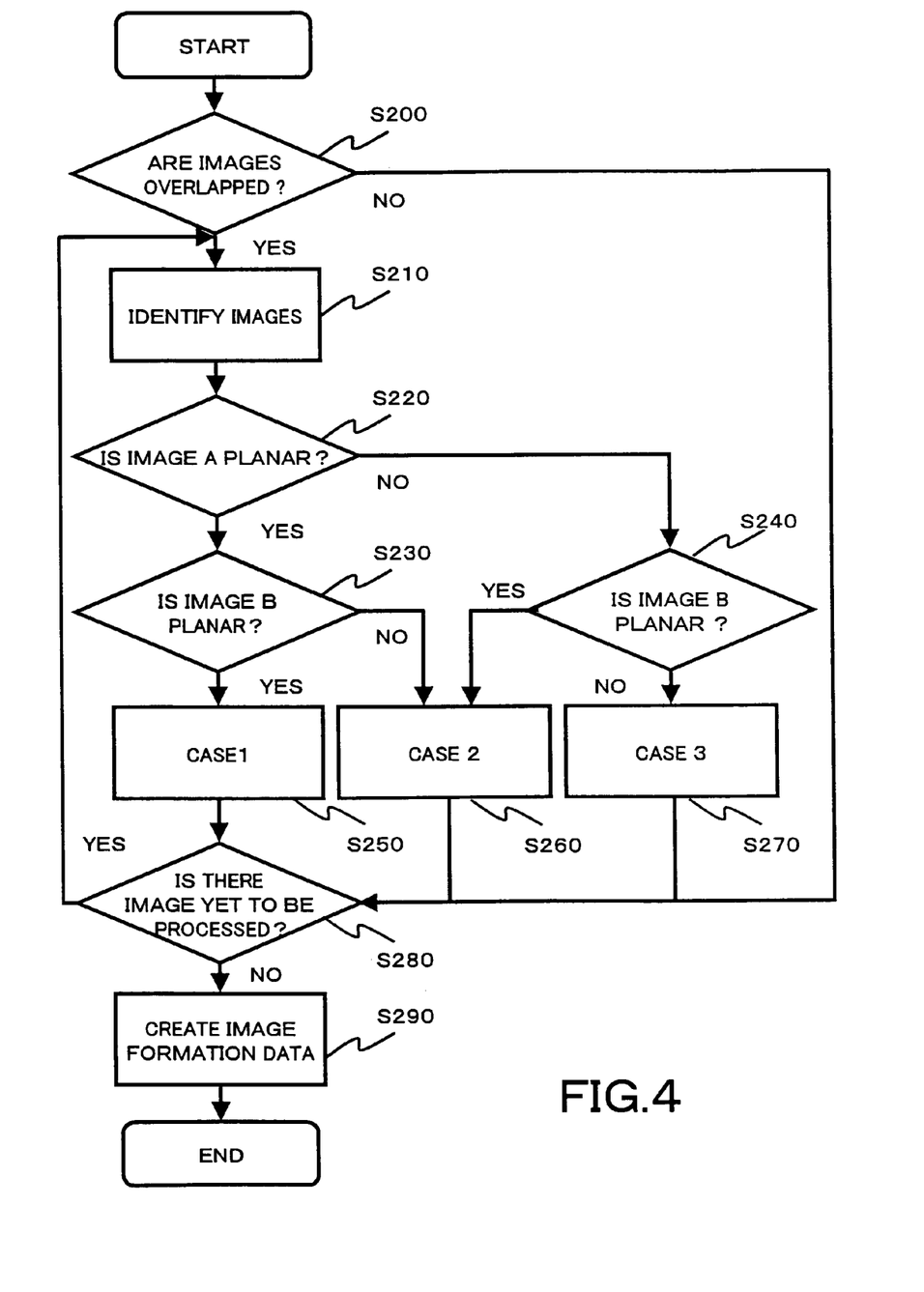
FIG. 4 is a flow chart illustrating the flow of image data processing by the image forming device in the present embodiment.

Referring to FIG. 4, the flow of image processing applied to the image in the overlapping area will be described in detail.

First, it is determined whether the image for the image data transmitted from the image editing device 20 has an overlap between images, such as figures and characters (at step 200), and when it is determined that images are not overlapped (NO at step 200), image formation data is created from the image data (step 290).

When it is determined that images are overlapped (YES at step 200), the overlapped images are identified (at step 210).

Here, in the present embodiment, it is assumed that two images, i.e., image A and image B are overlapped one over another.

Then, it is determined whether the image A is a planar image in which the image is planarly expressed (at step 220), and when it is determined that the image A is a planar image (YES at step 220), it is determined whether the image B is a planar image (at step 230).

When it is determined that the image B is a planar image (YES at step 230), the image processing in the overlapping area is performed as Case 1(at step 250), and when it is determined that the image B is not a planar image (NO at step 230), the image processing in the overlapping area is performed as Case 2(at step 260).

At the step 220, when it is determined that the image A is not a planar image (NO at step 220), it is determined whether the image B is a planar image (at step 240).

When it is determined that the image A is a planar image (YES at step 240), the image processing is applied to the overlapping area as Case 2(at step 260), and when it is determined that the image B is not a planar image (NO at step 240), the image processing is applied to the overlapping area as Case 3(at step 270).

In other words, when both the image A and the image B are a planar image, the image processing is applied to the overlapping area as Case 1; when either the image A or the image B is an embossed image, which is an image three-dimensionally expressed with a foaming toner and color toners placed on the foaming toner, the image processing is applied to the overlapping area as case 2; and when both the image A and the image B are an embossed image, the image processing is applied to the overlapping area as Case 3.

When the image processing has been applied as either of the Cases 1 to 3, it is determined whether there is an overlap between images that has not been subjected to the image processing (at step 280). Then, when it is determined that there is an overlap between images that has not been subjected to the image processing (YES at step 280), the images which are overlapped one over another are identified (at step 210). When it is determined that there is no overlap between images that has not been subjected to the image processing (NO at step 280), image formation data is created from the image data (at step 290).

Next, the flow of image processing of each of the Cases 1 to 3 will be described in detail with the use of the respective flow charts.

Figure 5:
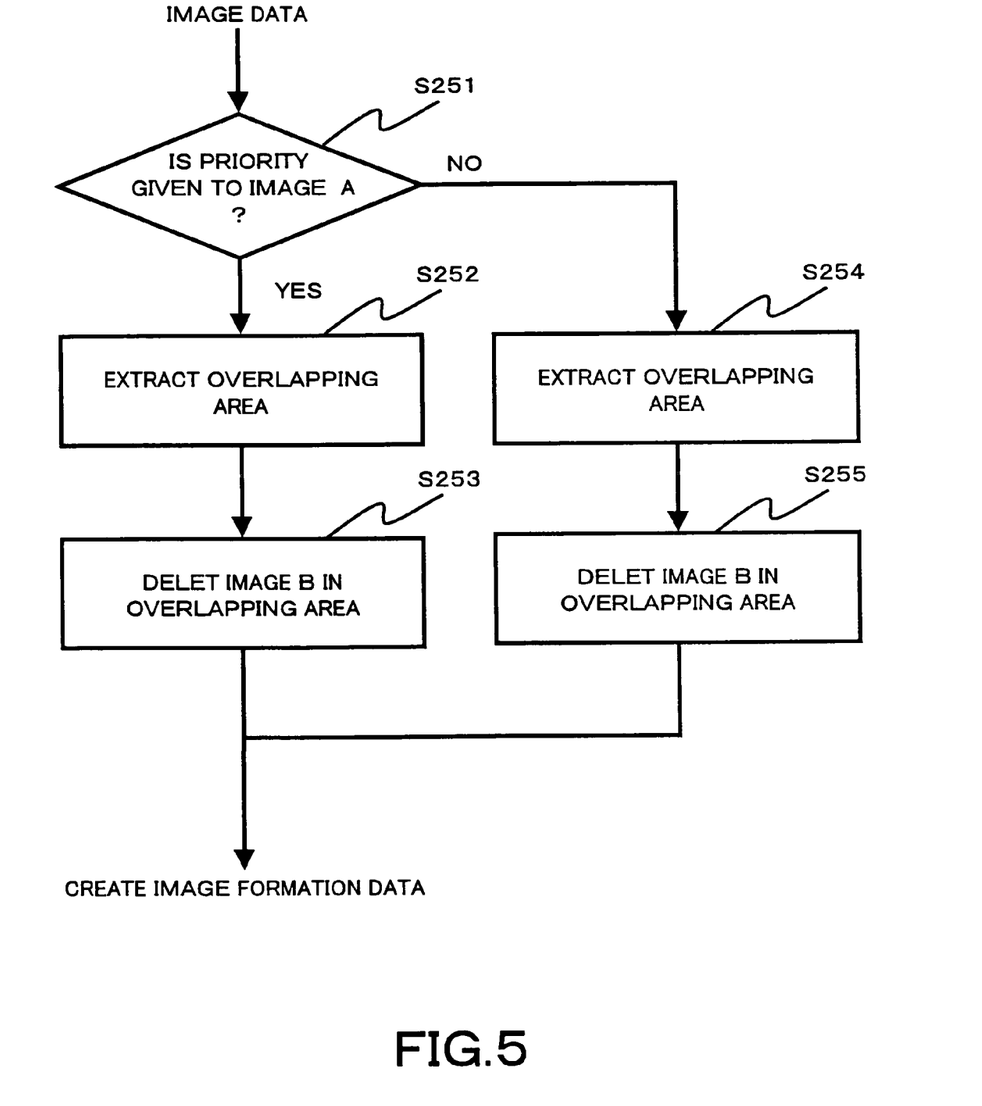
FIG. 5 is a flow chart illustrating the flow of image processing of Case 1 in the present embodiment.

FIG. 5 is a flow chart illustrating the flow of image processing of Case 1 where both the image A and the image B are a planar image.

First, the priority ranks in representing the image A and the image B are determined (at step 251).

When it is determined that the image A is to be represented, given priority over the image B (that the priority rank for the image A is higher than that for the image B) (YES at step 251), the overlapping area where the image A and the image B are overlapped one over another is extracted (at step 252), and the image in the overlapping area of the image B, which priority rank is lower, is deleted (at step 253) for creation of image formation data.

On the other hand, when it is determined that the image B is to be represented, given priority over the image A (that the priority rank for the image B is higher than that for the image A) (NO at step 251), the overlapping area where the image A and the image B are overlapped one over another is extracted (at step 254), and the image in the overlapping area of the image A, which priority rank is lower, is deleted (at step 255) for creation of image formation data.

In the present embodiment, the image in the overlapping area that has a lower priority rank is deleted before image formation data being created. Alternatively, as in a case where the image in the overlapping area is represented while utilizing the image that has a lower priority rank, image formation data may be created without deleting the image which has a lower priority rank, as required.

Such a processing can be instructed, for example, by adding information for instructing the method of image processing to the image data in the image editing device, and transmitting the image data to which the instruction information has been added, to the image forming device.

Figure 6A:
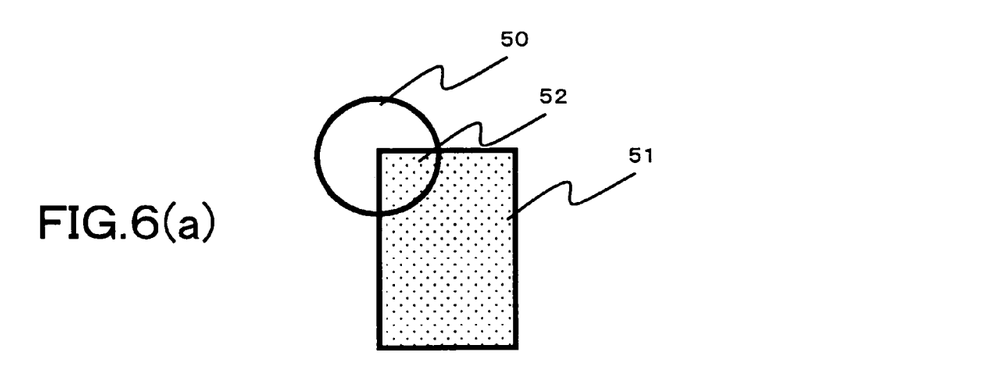
FIGS. 6(a) through 6(c) are conceptual drawings illustrating an example of image processing of Case 1 in the present embodiment.
Figure 6B:
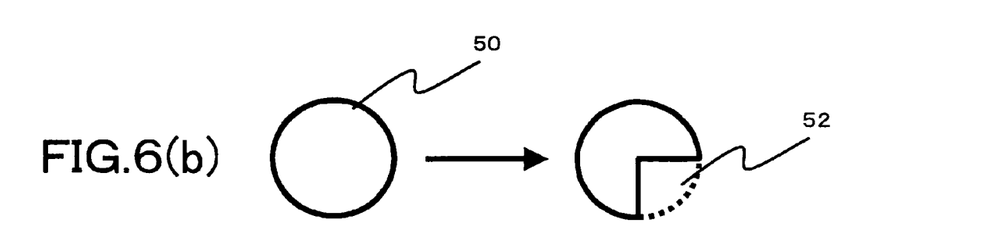
Figure 6C:
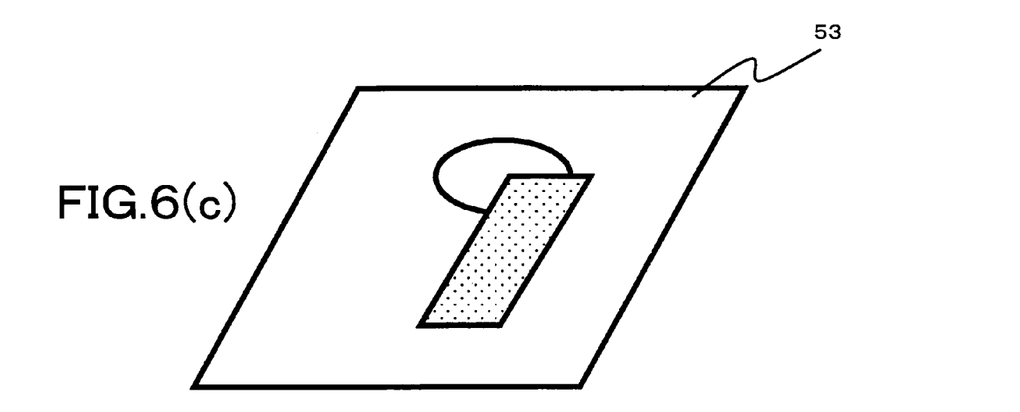

FIG. 6 is a conceptual drawing illustrating an example of image processing of Case 1. For example, as shown in FIG. 6(a), when a particular image having an area 52 where parts of an image A50 and an image B51, which are planar images, are overlapped one over another is to be formed into an image on the recording paper, the image processing for deleting the image in the overlapping area 52 of the image A50, which has a lower priority rank, is carried out, as shown in FIG. 6(b), before image formation data being created, and as shown in FIG. 6(c), the image is formed into an image on a recording paper 53 such that a part of the image B51, which has a higher priority rank, is overlapped on the image A50, which has a lower priority rank.

When image formation data is to be created with the image which has a lower priority rank being not deleted, as in a case where the image in the overlapping area is to be expressed by utilizing the image which has a lower priority rank, the image A is first formed into an image with the image in the overlapping area as shown in FIG. 6(b) being not deleted, and then the image B is formed into an image.

Figure 7:
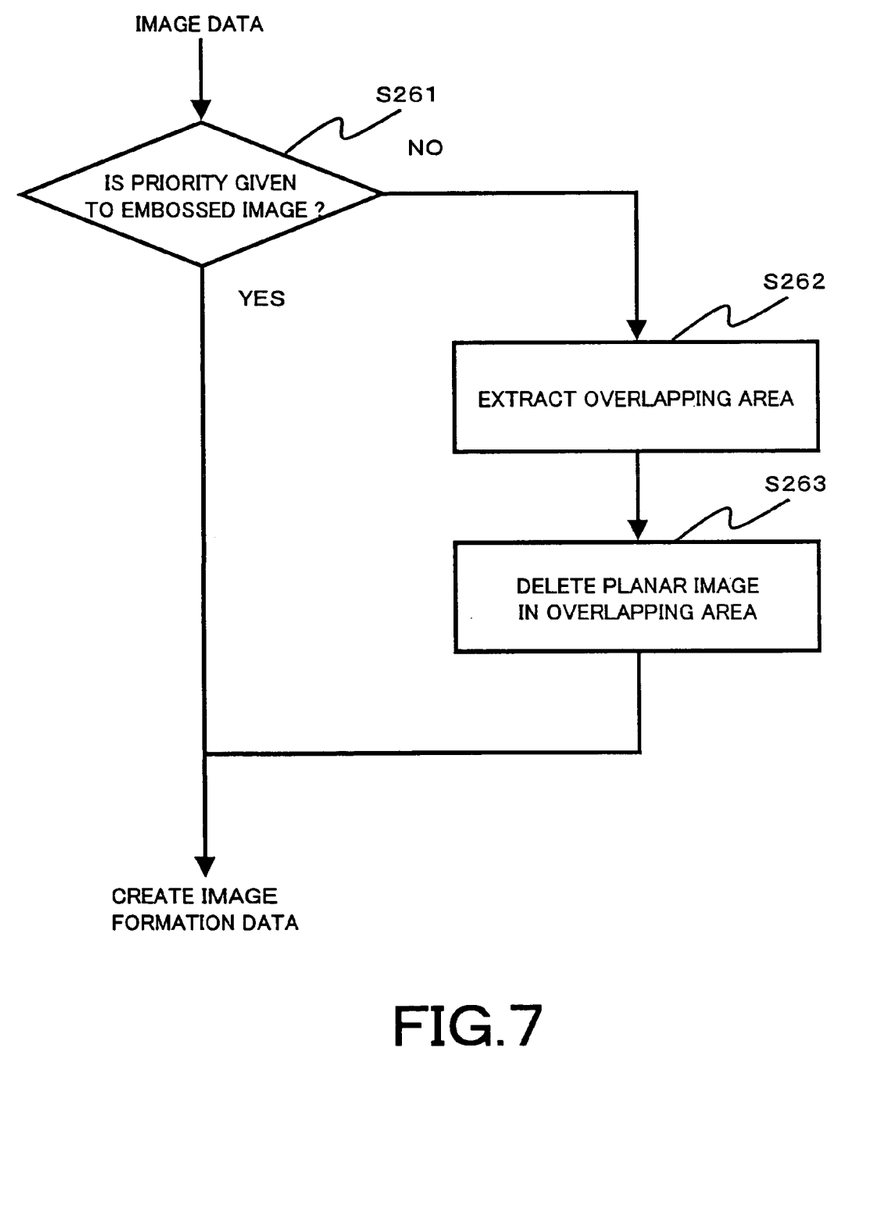
FIG. 7 is a flow chart illustrating the flow of image processing of Case 2 in the present embodiment.

Next, FIG. 7 is a flow chart illustrating the flow of image processing of Case 2 where one of the image A and the image B is a planar image, and the other is an embossed image.

First, the priority rank for the embossed image is determined from the priority ranks in representing the image A and the image B (at step 261).

When it is determined that the image which is an embossed image is not to be represented, without being given priority over the image which is a planar image (that the priority rank for the image which is an embossed image is lower) (NO at step 261), the overlapping area where the image A and the image B are overlapped one over another is extracted (at step 262), and the color image in the overlapping area of the image which is an embossed image is deleted (at step 263) for creation of image formation data.

On the other hand, when it is determined that the image which is an embossed image is to be represented, given priority over the image which is a planar image (that the priority rank for the image which is an embossed image is higher) (YES at step 261), image formation data is created with the image in the overlapping area of the image which is a planar image being not deleted.

Figure 8A:
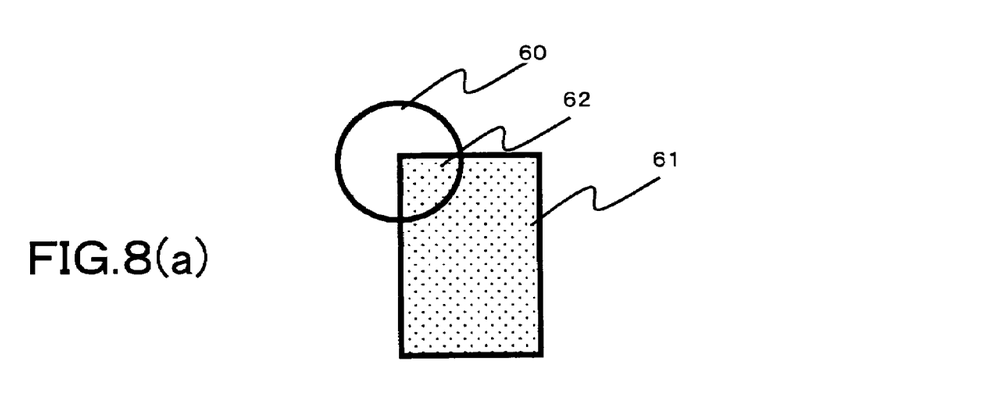
FIGS. 8(a) through 8(c) are conceptual drawings illustrating an example of image processing of Case 2 in the present embodiment.
Figure 8B:
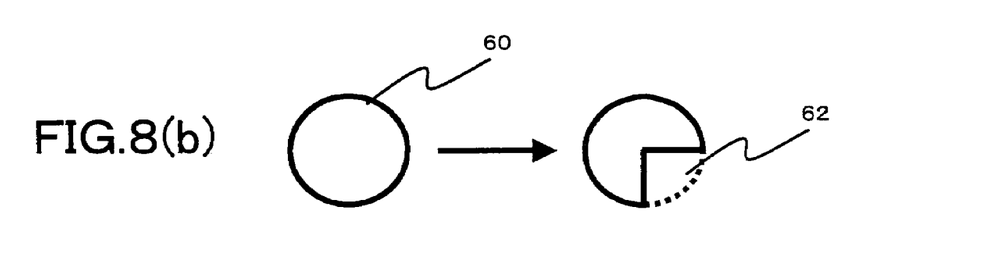
Figure 8C:
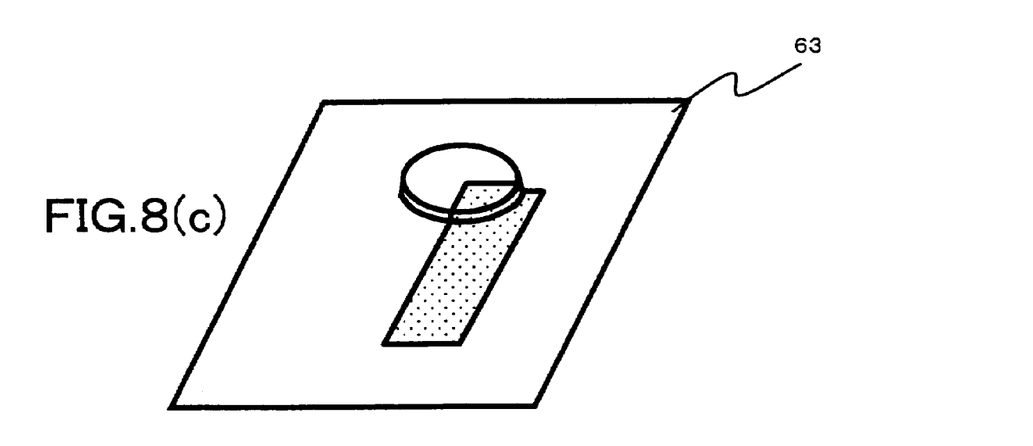

FIG. 8 is a conceptual drawing illustrating an example of image processing of Case 2. As shown in FIG. 8(a), for example, when a particular image having an area 62 where parts of an image A60, which is an embossed image, and an image B61, which is a planar image, are overlapped one over another, is to be formed into an image on the recording paper, the image processing for deleting the image in the overlapping area 62 of the image A60, which has a lower priority rank, is applied, as shown in FIG. 8(b), before image formation data being created, and as shown in FIG. 8(c), the image is formed into an image on a recording paper 63 such that a part of the image B61, which has a higher priority rank, is overlapped on the image A60, which has a lower priority rank.

In the present embodiment, when the priority rank for the image which is a planar image is higher than that for the image which is an embossed image, only the color image in the overlapping area of the embossed image is deleted.

When, for example, a particular planar image has a higher priority rank, it is preferable that the image processing is applied such that the planar image in the overlapping area is prevented from being inadequately represented resulting from a part of the planar image being formed into an image on the foaming toner; such that, the color for the border area between the planar image and the embossed image is deepened so that the color for that area is prevented from being thinned by the expansion of the foaming toner, for example.

Figure 9A:
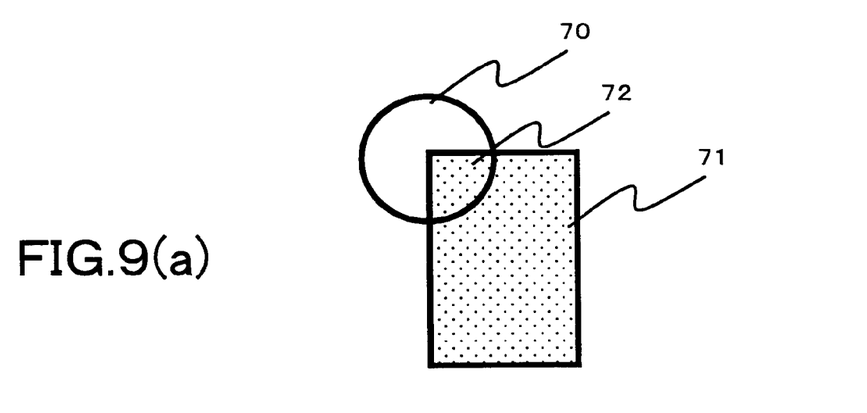
FIGS. 9(a) and 9(b) are conceptual drawings illustrating an example of image processing of Case 2 in the present embodiment.
Figure 9B:
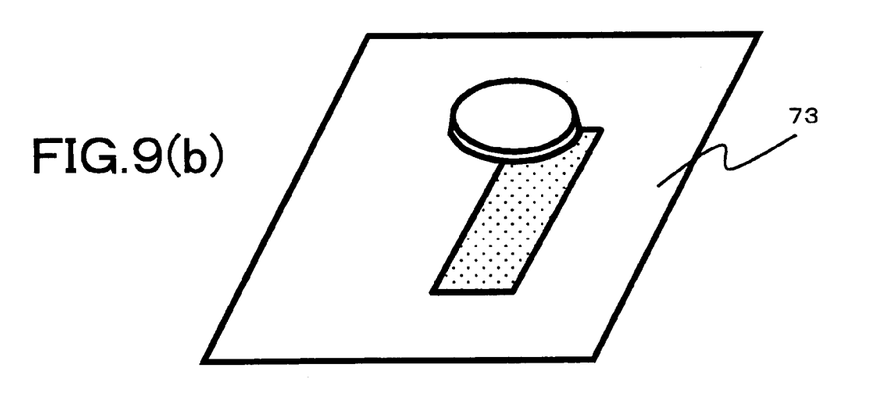

Incidentally, when a particular image with which the embossed image has a priority rank higher than that of the planar image is to be formed into an image (for example, when a particular image with which an overlapping area 72 where an image A70, which is an embossed image, and an image B71, a planar image, are overlapped one over another is provided, as shown in FIG. 9(a), and the priority rank for the image A70 is higher than that for the image B71 is to be formed into an image), image formation data for forming a planar image is created with the image processing for deleting the image in the overlapping area of the planar image being not carried out, which is followed by forming the planar image into an image, and then forming an embossed image for formation of an image on a recording paper 73 as shown in FIG. (b).

This is because an embossed image consists of the foaming toner for expressing an embossed image and a color image which is formed by placing color toners on the foaming toner, and thus the planar image in the overlapping area is covered with the foaming toner, which means that the planar image can have no effect on the color image. Therefore, with the planar image in the overlapping area being deleted, the embossed image in the overlapping area can be satisfactorily formed into an image.

In the present embodiment, only the color image in an embossed image is deleted. Alternatively, the system may be configured such that the image processing is carried out to cause the color image to be deleted together with the image provided by the foaming toner for expression of an embossed image for the image formation.

Also, when the priority rank for the embossed image is higher than that for the planar image, the planar image in the overlapping area is not deleted. Alternatively, the system may be configured such that the planar image in the overlapping area is deleted for directly depositing the foaming toner on the recording paper or minimizing the consumption of the color toner(s).

Figure 10:
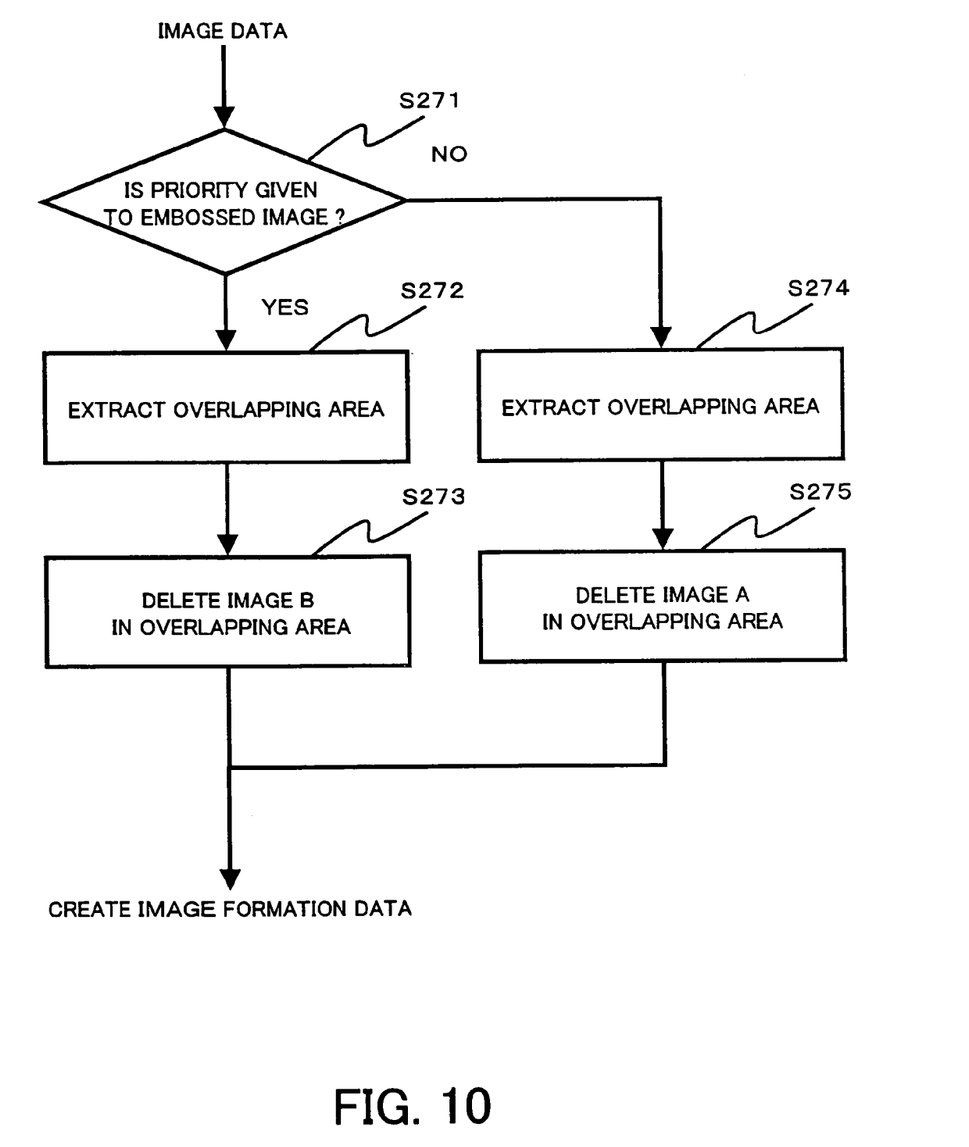
FIG. 10 is a conceptual drawing illustrating an example of image processing of Case 3 in the present embodiment.

FIG. 10 is a flow chart illustrating the flow of image processing of Case 3 where both the image A and the image B are an embossed image.

First, the priority ranks in representing the image A and the image B are determined (at step 271).

When it is determined that the image A is to be represented, given priority over the image B (that the priority rank for the image A is higher than that for the image B) (YES at step 271), the overlapping area where the image A and the image B are overlapped one over another is extracted (at step 272), and the image in the overlapping area of the image B, which priority rank is lower, is deleted (at step 273) for creation of image formation data.

On the other hand, when it is determined that the image B is to be represented, given priority over the image A (that the priority rank for the image B is higher than that for the image A) (NO at step 271), the overlapping area where the image A and the image B are overlapped one over another is extracted (at step 274), and the image in the overlapping area of the image A, which priority rank is lower, is deleted (at step 275) for creation of image formation data.

In the present embodiment, the image in the overlapping area that has a lower priority rank (the foaming toner and the color image) is deleted. However, in such a case where the image which has a lower priority rank is to be made the most of to express the image in the overlapping area, image formation data may be created with only the foaming toner or the color image being deleted, as required.

Figure 11A:
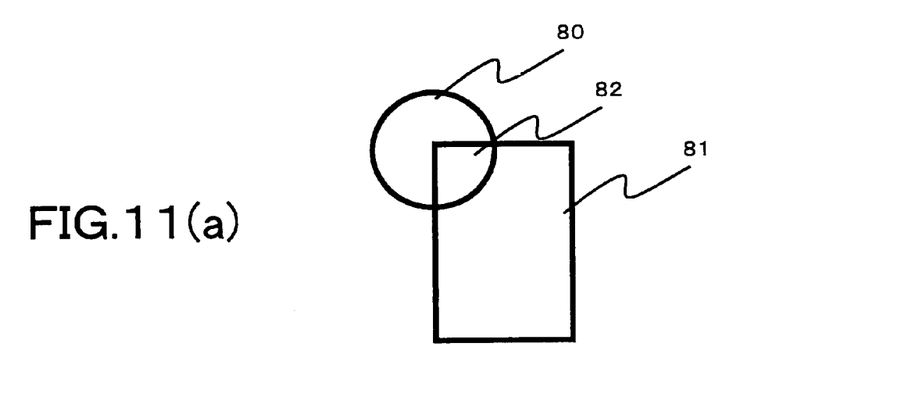
FIGS. 11(a) through 11(c) are conceptual drawings illustrating an example of image processing of Case 3 in the present embodiment.
Figure 11B:
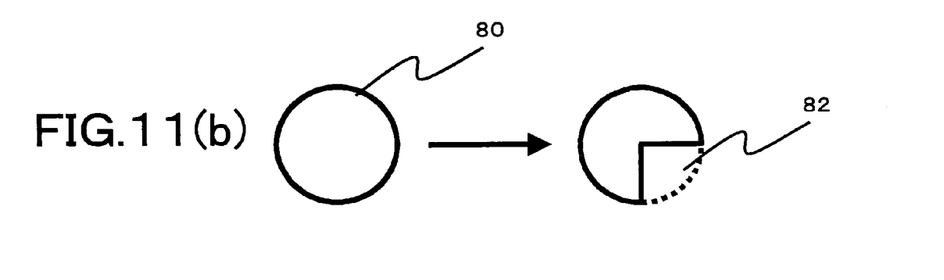
Figure 11C:
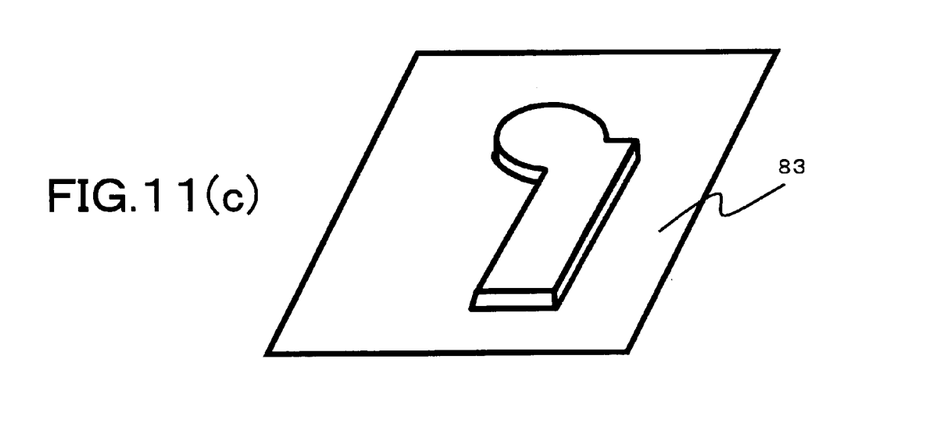

FIG. 11 is a conceptual drawing illustrating an example of image processing of Case 3. As shown in FIG. 11(a), when a particular image having an overlapping area 82 where parts of an image B81 and an image A80, which are both an embossed image, the priority rank for the image B81 being higher than that for the image A80, are overlapped one over another, is to be formed into an image, the image processing for deleting the image in the overlapping area 82 of the image A80, which has a lower priority rank, is applied, as shown in FIG. 11(b), before image formation data being created, and as shown in FIG. 11(c), the image is formed into an image on a recording paper 83, because the embossed images are overlapped one over another.

In this example, both the image A and the image B are embossed images, and the heights of the images when formed into an image are equal to each other, thus no embossed boundary is basically provided in the border area between the image A and the image B after image formation.

When it is determined that both the image A and the image B are embossed images, it may be so configured that an image formation data is created with the image processing being not applied to the overlapping area, and by forming the image A into an image before forming the image B into an image, an image is formed in which parts of the image A and the image B are overlapped one over another.

Figure 12A:
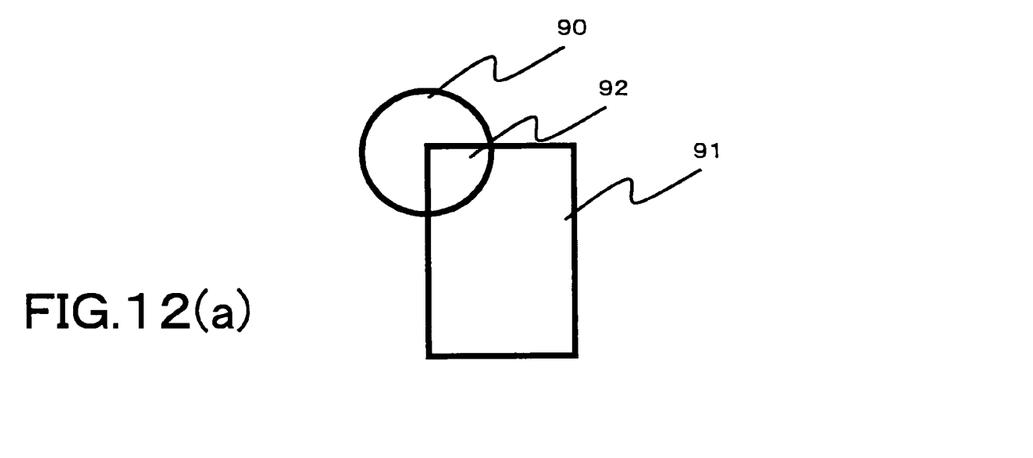
FIGS. 12(a) and 12(b) are conceptual drawings illustrating an example of image processing of Case 3 in the present embodiment.
Figure 12B:
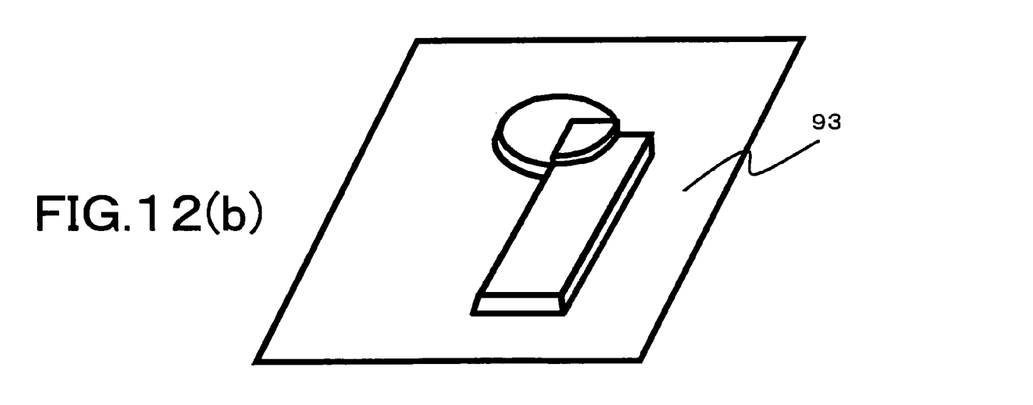

For example, as shown in FIG. 12(a), when an image having a partially overlapping area 92 where parts of an image A90 and an image B91, which are both an embossed image, are overlapped one over another is to be formed into an image on the recording paper, an image formation data is created with the image processing for deleting the image in the overlapping area of the image which priority rank is lower being not carried out. Then as shown in FIG. 12(b), the image is formed into an image on a recording paper 93 such that a part of the embossed image 91 which priority rank is higher is overlapped on the embossed image A90 which priority rank is lower.

The invention claimed is:

1. An image forming device which forms an image into an image on a recording paper, comprising:
    means for determining that there is an area where two images are overlapped one over another at least partially; and
    means for determining attributes of these two images,
    wherein for an image having a specific attribute of these two images, no image is deleted even in the overlapping area.

2. An image forming device which forms an image into an image on a recording paper, comprising:
    means for determining that there is an area where two images are overlapped one over another at least partially;
    means for determining priority ranks which represent a top or bottom in overlapped status of these two images in the overlapping area; and
    means for forming an image which priority rank is lower, and thereupon, forming an image which priority rank is higher, in the overlapping area.

3. The image forming device of claim 2, further comprising means for determining attributes of these two images in the overlapping area, wherein
    these two images are an image having a specific attribute, and an image having another attribute,
    when the image having the specific attribute has a priority rank lower than that for the image having the another attribute, the image having the specific attribute is formed into an image, and thereupon, the image having the another attribute is formed into an image in the overlapping area, and
    when the image having the specific attribute has a priority rank higher than that for the image having the another attribute, the image having the specific attribute is formed into an image, and the image having another attribute being not formed into an image in the overlapping area.

4. The image forming device of claim 3, further comprising means for selecting either forming the image having the specific attribute in the overlapping area into an image, and thereupon, forming the image having the another attribute into an image, or forming the image having the specific attribute in the overlapping area into an image, and not forming the image having the another attribute into an image, when the image having the specific attribute has a priority rank lower than that for the image having the another attribute.

5. The image forming device of claim 4, wherein, when both of these two images are the image having the specific attribute or the image having the another attribute, the image which has a higher priority rank is formed into an image, and the image which has a lower priority rank is not formed into an image in the overlapping area.

6. The image forming device of claim 4, wherein an attribute of the image having the specific attribute is an embossed image.

7. The image forming device of claim 3, wherein, when both of these two images are the image having the specific attribute or the image having the another attribute, the image which has a higher priority rank is formed into an image, and the image which has a lower priority rank is not formed into an image in the overlapping area.

8. The image forming device of claim 7, wherein an attribute of the image having the specific attribute is an embossed image.

9. The image forming device of claim 3, wherein an attribute of the image having the specific attribute is an embossed image.

10. The image forming device of claim 3, wherein, when both of these two images are the image having the specific attribute or the image having the another attribute, the image which has a higher priority rank is formed into an image, and the image which has a lower priority rank is not formed into an image in the overlapping area.

11. The image forming device of claim 3, wherein an attribute of the image having the specific attribute is an embossed image.

12. An image forming method for forming an image into an image on a recording paper, comprising the steps of:
    determining an overlapping area where two images are overlapped at least partially,
    determining priority ranks which represent a top or bottom in an overlapped status of these two images in the overlapping area, and
    forming an image which has a lower priority rank into an image, and thereupon, forming the image which has a higher priority rank into an image.

13. The image forming method of claim 12, further comprising the step of determining attributes of these two images in the overlapping area,
  wherein, when it is determined that both of these two images are an image having a specific attribute and an image having another attribute,
  the image having the specific attribute is formed into an image, and thereupon, the image having the another attribute is formed into an image in the overlapping area when the image having the specific attribute has a priority rank lower than that for the image having the another attribute, and
  the image having the specific attribute is formed into an image, and the image having the another attribute is not formed into an image in the overlapping area when the image having the specific attribute has a priority rank higher than that for the image having the another attribute.

14. The image forming method of claim 13, wherein an attribute of the image having the specific attribute is an embossed image.

* * * * *